United States Patent [19]
Nilsen et al.

[11] Patent Number: 4,759,672
[45] Date of Patent: Jul. 26, 1988

[54] FASTENER HEAD WITH STABILIZING RING

[75] Inventors: Martin Nilsen, Elgin; David B. Speer, Algonquin, both of Ill.

[73] Assignee: Illinois Tool Works Inc., Chicago, Ill.

[21] Appl. No.: 47,440

[22] Filed: May 8, 1987

[51] Int. Cl.⁴ ............... F16B 19/00; F16B 33/00; A47G 3/00

[52] U.S. Cl. .................... 411/375; 411/402; 10/86 C

[58] Field of Search ........... 411/185, 186, 368–370, 411/373, 375, 376, 429–431, 402, 407, 410; 10/86 C

[56] References Cited

U.S. PATENT DOCUMENTS

| | | | |
|---|---|---|---|
| 1,229,911 | 6/1917 | Dodds | 411/186 |
| 3,656,396 | 4/1972 | Gutshall | |
| 4,310,272 | 1/1982 | Rich et al. | 411/185 |
| 4,460,300 | 7/1984 | Bettini et al. | 411/375 |
| 4,669,937 | 6/1987 | Feldman | 10/86 C |

Primary Examiner—Neill R. Wilson
Attorney, Agent, or Firm—D. I. Roche; T. W. Buckman

[57] ABSTRACT

A fastener head, preferably a capped fastener head, including a sloping flange surrounding a central wrenching portion, having wrenching surfaces, such as axial hexagonal surfaces.

A rib disposed on the sloping flange provides stability to a fastener head having such a rib by increasing the overturning moment required to buckle a column comprised of a fastener and driver. The rib is continuous around the flange and is as high as the bottom of the wrenching surfaces to reduce wobble during driving of the fastener head.

6 Claims, 1 Drawing Sheet

FASTENER HEAD WITH STABILIZING RING

BACKGROUND AND SUMMARY OF THE INVENTION

This invention relates primarily to threaded fasteners having heads with wrenching surfaces. In particular, the invention relates to a fastener which has an annular protrusion disposed adjacent to the wrenching surface, the protrusion providing a means for stabilizing the fastener during driving. The invention has particular application for screws having self-drilling tips.

Typically, fasteners having external wrenching surfaces, such as hex-head fasteners, are manufactured with a dimension between oppositely facing surfaces which is substantially less than the corresponding dimension of a driving socket. Obviously, the difference between these dimensions is intended to allow insertion of the fastener head into the socket. This difference in dimension or play creates a situation which allows pivoting of the socket around the fastener head. In a drilling screw, this creates instability if there is any eccentricity in the drilling point relative to the fastener head. Fasteners having hexagonal wrenching surfaces often include an integral washer which is sloped in the direction of the drilling in order to create a recess on the underside of the integral washer. Drivers used to drive such fasteners frequently have flat end surfaces. This combination of shapes means that a line of contact between the sloping washer and the flat end surface, occurs in the inner edge of the flat end surface of the driver. As the surface of the washer slopes away from the flat end surface, a clearance is created which allows tilting of the driver.

The fastener of the present invention addresses this problem by forming a ring disposed on the sloping surface of the integral washer. The ring engages the central portion of the flat end surface of the driver, and substantially reduces the tendency of the driver to tilt about the head of the fastener. In a preferred embodiment, the ring is stamped into a stainless steel head cap which is placed over a carbon steel fastener head.

The advantages of the present invention will be better understood upon a reading of the following specifications read in conjunction with the attached drawing, wherein:

DETAILED DESCRIPTION OF THE INVENTION

Figure 1:
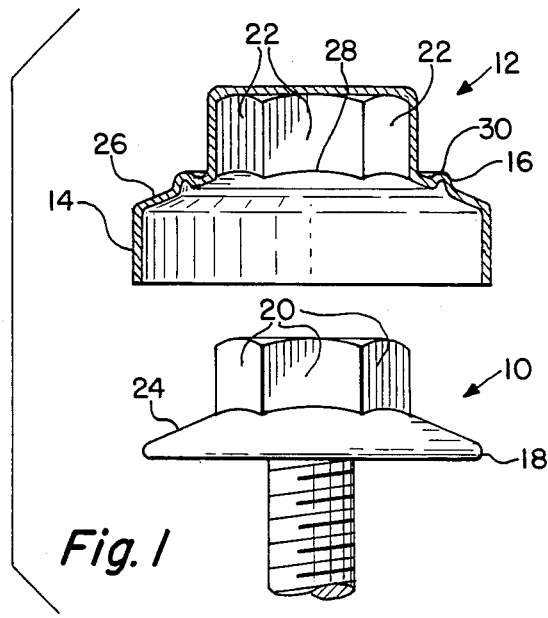
FIG. 1 shows an exploded view, and partial section of a fastener and head cap prior to assembly.

FIG. 1 is an exploded view of the fastener head 10 and head cap 12 of the present invention. The fastener head 10 includes a flange 18 extending radially outwardly from the wrenching surface 20. The flange 18 includes an upper surface 24, and a corresponding sloping lower surface (not shown). The head cap 12 has wrenching surfaces 22 which match those of the fastener head. A sloping upper surface 26 of the head cap is substantially parallel to the sloping upper surface 24 of the fastener head. However, an annular rib is formed in the head cap in approximately the middle of the sloping upper surface 26.

The annular rib 16 has an upper surface 30, the height of which substantially corresponds to the bottom 28 of the wrenching surfaces 22. Upon assembly of the cap to the fastener head, the skirt 14 is deformed around the flange 18 of the fastener head, and extends into a recess formed on the underside of the flange. An assembled cap and head are shown in FIG. 3.

Figure 2:
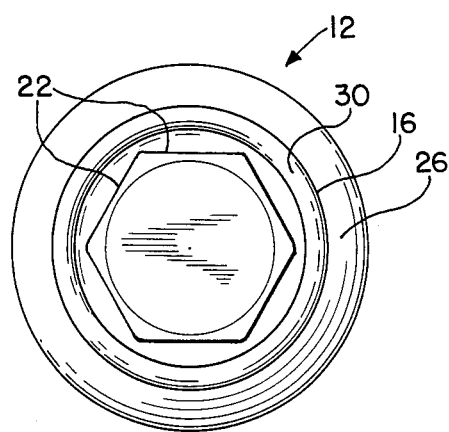
FIG. 2 shows a plan view of a fastener head in accordance with the present invention.

FIG. 2 is a plan view of a fastener head cap 12 made in accordance with the present invention. The wrenching surfaces 22 form a hexagonal shape. The annular rib 16 surrounds the wrenching surfaces and is disposed on the upper surface 26 of the head cap 12. The upper surface 30 of the annular rib 16 forms a smooth, planar bearing surface for the end of a driver used to install a fastener having the features of the present invention.

Figure 3:
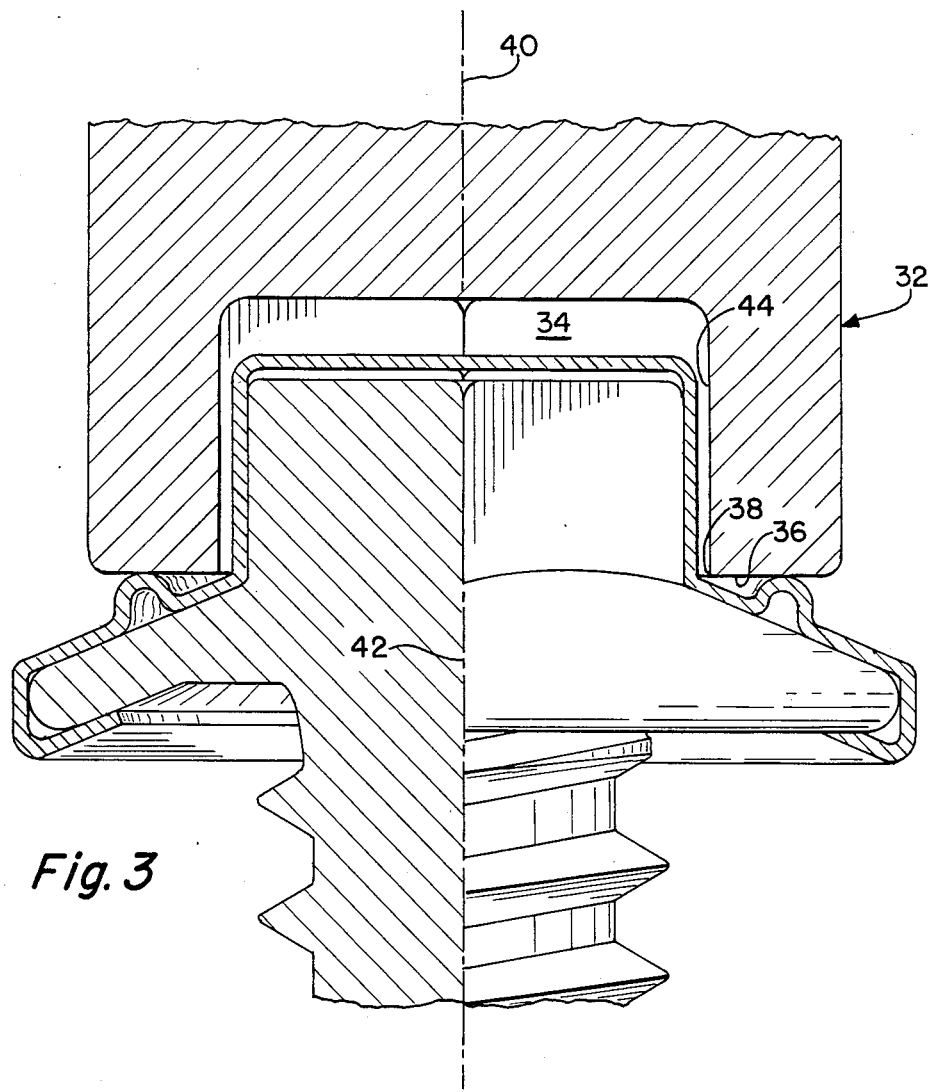
FIG. 3 is an elevational view and partial section of the fastener inserted into the socket of a driver.

FIG. 3 shows a fastener having a head cap 12 which is inserted into the socket 34 of a driver 32. The driver has a substantial flat end surface 36, which is substantially perpendicular to the axis 40 of the driver. When the fastener head is inserted into the driver socket the flat end surface 36 should be parallel to the plane of the upper extremity of the rib 16. The end surface 36 has an inner edge 38 which is located at the intersection of the end surface 36 and the driving surfaces 44 of the driver socket 34. However, because the height of the rib 16 is at the location of the bottom 28 of the wrenching surfaces 22, the inner edge does not come into contact with the head cap 12. Because the relatively sharp inner edge 38 of the driver does not contact the head cap 12, damage to the head cap is minimized.

The fastener head and cap of the present invention are primarily designed for use with self-drilling fasteners. Self-drilling fasteners require the application of a substantial end load during the drilling stage of installing the fasteners. This end load has a tendency to cause the column formed by the fastener and driver combination to buckle, particularly when any eccentricity exists between the fastener drilling tip and the fastener head. Such eccentricity can be caused by a cold forming operation used to form the fastener head.

The annular rib 16 increases the stability of the column formed by the fastener and driver in combination. The point of contact between the fastener head and the driver is moved radially outwardly. This increases the overturning moment required to buckle the column.

Therefore, there are two substantial benefits of the annular rib 16. First, the inner edge 38 of the driver is prevented from damaging the fastener head cap. Secondly, the rib increases the stability of the column formed by the driver and fastener during a drilling operation.

It should be noted that in the preferred embodiment, a carbon steel fastener has a separate head cap. However, the advantages of the present invention could be employed in a unitary fastener head. In particular, the annular rib discussed above could be formed in the upper surface of the flange during a cold forming operation. While a specific embodiment of the invention has been described in detail above, other variations and modifications apparent to those skilled in the art are intended to fall within the spirit and scope of the appendant claims.

I claim:

1. A fastener head comprising a plurality of wrenching surfaces, an integral washer forming a lateral surface extending radially outwardly from said wrenching surfaces, said lateral surface sloping generally away from said wrenching surfaces, a continuous annular rib projecting upwardly from said lateral surface, said rib having an upper extremity defining a plane which is generally perpendicular to said wrenching surfaces, said upper extremity terminating at an axial position generally corresponding to lower portions of said wrenching surfaces, said rib defining a bearing surface for reducing wobble of said head during driving.

2. A fastener head according to claim 1 wherein said head comprises an inner head and a head cap substantially covering said wrenching surfaces and upper portions of said lateral surface.

3. A fastener head according to claim 1 wherein said rib is formed in said head cap.

4. A fastener head cap according to claim 3 wherein said head cap is a sheet metal stamping and said rib is a stamped formation in said head cap.

5. A capped fastener comprising a solid metal head and a sheet metal head cap having matching laterally extended flanges and central wrenching portions including wrenching surfaces, said flanges generally surrounding said wrenching portions, said cap closely fitting and substantially encapsulating said solid metal head, said cap having a rib formed therein, said rib having an upper extremity defining a plane which is generally perpendicular to said wrenching surfaces, said upper extremity terminating at an axial position generally corresponding to lower portions of said wrenching surfaces.

6. A capped fastener head according to claim 5 wherein said rib is continuous about said wrenching portion.

* * * * *